Nov. 17, 1959 I. R. STUDEBAKER 2,913,623
CATHODE-RAY TUBE SYSTEM
Filed Jan. 10, 1958
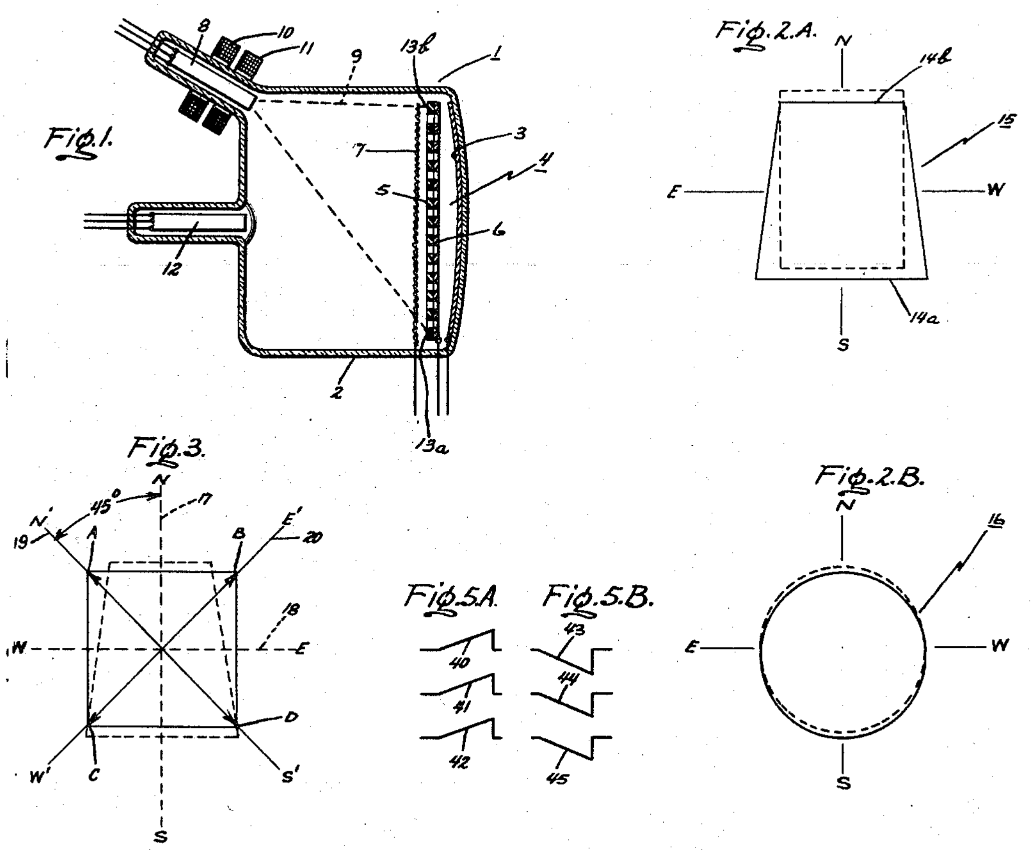
Fig. 1, Fig. 2.A., Fig. 3., Fig. 5A., Fig. 5.B., Fig. 2.B.
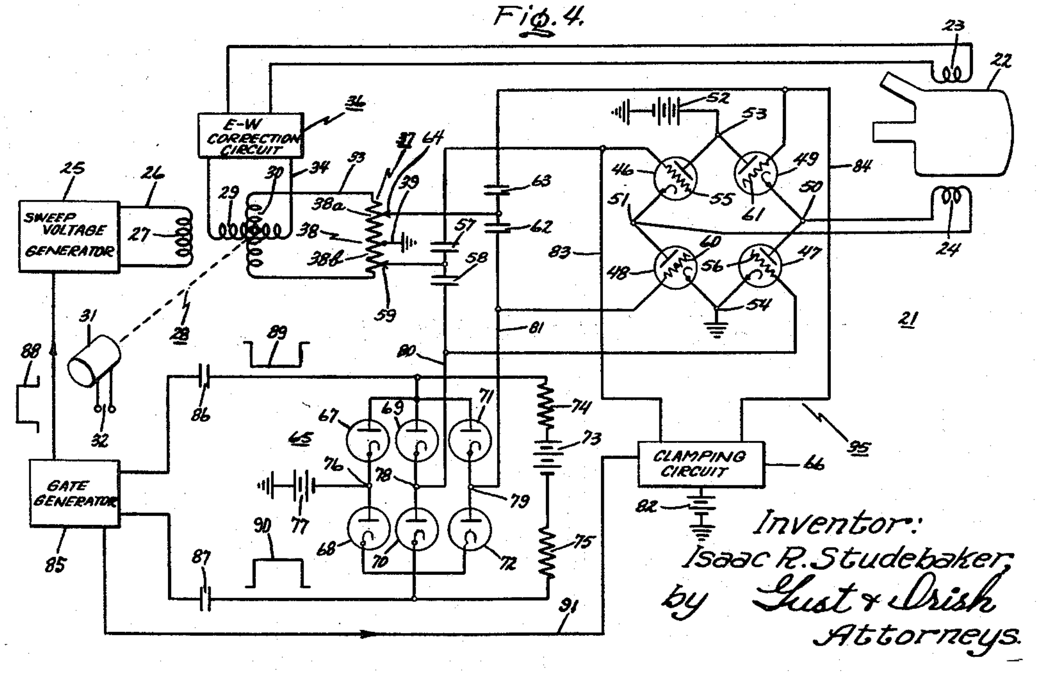
Fig. 4.
Inventor:
Isaac R. Studebaker,
by Gust & Irish
Attorneys.

2,913,623
Patented Nov. 17, 1959

2,913,623

CATHODE-RAY TUBE SYSTEM

Isaac Roger Studebaker, Fort Wayne, Ind., assignor to International Telephone and Telegraph Corporation Application January 10, 1958, Serial No. 708,248
13 Claims. (Cl. 315—24)

This invention relates to cathode ray tube systems having polar or P.P.I. scanning, and more particularly to the correction of keystone distortion encountered in such systems.

So called "keystone" distortion of the displayed image is encountered in various types of cathode ray tubes, for example, signal-to-image charge storage tubes; this keystone distortion arises by virtue of the fact that the electron "writing" beam of the tube emanates from a point source and since it is deflected over a relatively large area surface, i.e., the charge storage screen or the display screen as the case may be, necessarily provides a longer trace or sweep in areas of the screen which are further removed from the beam source than other areas.

While numerous circuits and arrangements have been proposed for correcting keystone distortion in cathode ray tube systems having rectilinear or raster scanning, the present applicant is unaware of any system heretofor proposed for correcting keystone distortion in cathode ray tube systems having polar or P.P.I. (plan position indication) scanning.

It is therefore an object of this invention to provide an improved cathode ray tube system having polar or P.P.I. scanning with means for correcting keystone distortion.

In accordance with the broader aspects of my invention, I arrange the deflection elements of the cathode ray tube so that the deflection axes of the tube are displaced by substantially 45° with respect to the axes of the keystone distortion. Sweep voltage generating means and means for resolving the sweep voltage into sine and cosine components are provided in order to provide the polar scanning, and two deflection circuits respectively couple the resolving means to the deflection elements of the tube for applying sweep voltage components thereto. The deflection circuits respectively have means for providing a first gain in the sweep voltage components when the components are polarized to cause scanning in the two quadrants defined by the keystone distortion axes which have contracted distortion and for providing a second gain in the sweep voltage components when the same are polarized to cause scanning in the two quadrants which have expanded distortion; the deflection circuit means are arranged so that the first gain is higher than the second gain thereby correcting the keystone distortion. In the preferred embodiment of my invention, I provide first and second amplifying means in each of the deflection circuits arranged respectively to provide the first and second gains and clamping means coupled to the amplifying means for normally clamping the amplifying means to a reference potential and cutting off the same, the clamping means being arranged to release the clamp on the amplifying means responsive to the occurrence of a sweep voltage signal.

The above-mentioned and other features and objects of this invention and the manner of attaining them will become more apparent and the invention itself will be best understood by reference to the following description of an embodiment of the invention taken in conjunction with the accompanying drawings, wherein:

Fig. 1 is a cross-sectional view of a typical signal-to-image charge storage tube useful in explaining my invention;

Figs. 2*a* and 2*b* show the keystone distortion encountered in the tube of Fig. 1 with rectilinear and polar scanning respectively;

Fig. 3 diagrammatically shows the mode of operation of my invention;

Fig. 4 is a schematic diagram showing the preferred embodiment of my invention; and Figs. 5*a* and 5*b* respectively show the sweep voltage component polarities useful in explaining the operation of the circuit of Fig. 4.

Referring now to Fig. 1 there is shown a typical signal-to-image direct viewing charge storage tube, generally identified as 1, which comprises an enclosing envelope 2 having a conventional display screen 3 formed at one end. A perforate charge storage screen 4 formed of a dielectric layer 5 and a metal backing layer 6 is disposed within the envelope 2 and a fine mesh metal collector screen 7 is disposed in front of the dielectric layer 5 of the charge storage screen 4. A conventional electron gun assembly 8 is provided arranged to direct a high velocity "pencil" writing beam 9 onto the dielectric layer 5 of the charge storage screen 4. Suitable deflection coils 10 and 11 for causing the writing beam 9 to be scanned over the surface of the charge storage screen 4 are provided associated with the electron gun 8. In the conventional form of signal-to-image storage tube 1, the intensity of the high velocity pencil beam 9 is modulated by applying a modulating signal to a control grid of the electron gun 8 (not shown) and impingement of the writing beam upon the dielectric surface 5 of the charge storage screen 4 causes secondary emission therefrom thus leaving a charge image on the charge storage screen 4 responsive to the information contained in the writing beam 9 during its scanning of the charge storage screen. The charge image on the charge storage screen 4 is "read out" by flooding the charge storage screen 4 with a low velocity flood beam of electrons provided by the electron gun 12; the low velocity flood electrons pass through the apertures in the charge storage screen 4 and are modulated in response to the elemental charges thereon thereby to display a replica of the charge image on the display screen 3. It will be readily understood that the particular signal-to-image charge storage tube 1 described above is shown and described here for illustrative purposes only in connection with the explanation of my invention and that other cathode ray tubes may be advantageously employed in connection with my invention.

Referring now to Fig. 2*a* in addition to Fig. 1, it will be readily seen that the lower extremity **13*a* of the charge storage screen 4 is disposed at a considerably greater distance from the writing electron gun 8 than is the upper extremity 13*b*. Thus, with the arrangement shown, the uppermost horizontal scanning line 14*b* provided by the writing beam 9 in rectilinear or raster scanning will have a width considerably less than the lowermost scanning line 14*a***; inspection of Fig. 2*a* will immediately reveal that the resulting raster pattern 15 provided by rectilinear scanning has a "keystone" shaped configuration and thus this distortion is referred to as "keystone" distortion. In the event that polar or P.P.I. scanning is employed in the cathode ray tube 1, the keystone distortion effect is still present as shown in Fig. 2*b*, the resulting image 16 taking the shape of an ellipse. It will be understood that my invention for correcting keystone distortion in cathode ray tubes is applicable to polar or P.P.I. scanning systems and that the keystone distortion effect present in rectilinear scanning systems as shown in Fig. 2*a* is here discussed merely as an aid in explaining keystone distortion.

Referring now to Fig. 3, in which for purposes of simplicity of explanation, the keystone distortion with rectilinear scanning is again shown, the normal axes of deflection provided by deflection coils 10 and 11 are shown by the dashed lines 17 and 18 designated N—S and W—E respectively, and it will be seen that with the particular tube construction 1 of Fig. 1, the distortion has a contracting effect in the E—N and N—W quadrants defined by the axes 17 and 18 and an expanding effect in the other two quadrants W—S and S—E. It will now be seen that if the gain of the deflection circuitry is increased in the upper two quadrants E—N and N—W in which contracted keystone distortion appears, and likewise reduced in the lower two quadrants W—S and S—E in which expanded keystone distortion appears, the distortion would be substantially corrected. In order to effect this change in gain, in accordance with my invention, I shift the axes of deflection of the deflection coils 10 and 11 substantially 45° with respect to the normal axes of deflection and of keystone distortion N—S and W—E, the shifted axes of deflection being shown by the solid lines 19 and 20, designated N′—S′ and W′—E′ respectively. It will now be seen that if the gain in the direction E′ and N′ is increased and the gain in directions W′ and S′ is decreased, the keystone distortion, as shown in dashed lines in Fig. 3, will be corrected as shown in solid lines. In accordance with my invention therefore, I provide for increasing the gain during the period that scanning is taking place in the two quadrants E—N and N—W defined by the axes 17 and 18 of keystone distortion in which contracted distortion occurs and likewise, I decrease the gain during the time that scanning is taking place in the two quadrants W—S and S—E in which expanded distortion occurs.

Referring now to Fig. 4, my improved polar scanning cathode ray tube system with keystone distortion correction, generally identified as 21, includes cathode ray tube 22 which may be a signal-to-image direct viewing charge storage tube as shown in Fig. 1, or any other conventional cathode ray tube. Cathode ray tube 22 is shown as being provided with deflection coils 23 and 24, it being understood that conventional electrostatic deflection plates within the tube may be equally advantageously employed in practicing my invention. In order to provide polar or P.P.I. scanning of the electron beam in the tube 22, a conventional sweep voltage generator 25 which provides a suitable sweep voltage, such as a saw-tooth, is provided having its output circuit 26 connected to primary winding 27 of a conventional resolver 28. Resolver 28 has two rotatable secondary windings 29 and 30 physically displaced by 90° and arranged to be rotated by a suitable motor 31 adapted to be energized from an external source of power (not shown) by leads 32. Resolver 28 resolves the sweep voltage appearing across primary winding 27 into sine and cosine components in its output circuits 33 and 34 respectively connected to its secondary windings 30 and 29, as is well known in the art.

The output circuits 33 and 34 of resolver 28 are respectively connected to deflection coils 24 and 23 by identical deflection circuits 35 and 36. Deflection circuit 35 (and likewise deflection circuit 36) includes a push-pull or phase splitting circuit 37 in the form of a grounded center tap resistor 38 connected across output circuit 33 of resolver 28. Resistor 38 therefore derives oppositely polarized voltages from the sweep voltage component appearing in the output circuit 33, these oppositely polarized voltages appearing respectively across the two sections 38*a* and 38*b* of resistor 38 on either side of the grounded center tap 39. Thus referring to Figs. 5*a* and 5*b*, if a positive polarity sweep voltage component 40 appears in the output circuit 33 of resolver 28, a corresponding positive voltage 41 will appear across resistor section 38*a* and a negatively polarized corresponding voltage 42 will appear across the other resistor section 38*b*; this will immediately be recognized as a conventional push-pull arrangement. It will further be readily understood that when the secondary windings 29 and 30 of resolver 28 have been physically rotated by the motor 31 to a position 180° from that in which the voltage 40 was provided in the output circuit 33, the voltage in the output circuit 33 will then be opposite in polarity from voltage 40 as shown at 43 with the voltage across resistor section 38*a* corresponding thereto as shown at 44 and the voltage across resistor section 38*b* having the opposite polarity as shown at 45.

In order to provide for an increased gain in the quadrants defined by the axes of keystone distortion having contracted distortion and conversely decreased gain in the quadrants defined by the axes of keystone distortion having expanded distortion, I provide four vacuum tube amplifiers, 46, 47, 48 and 49, shown here as being triodes, connected in a bridge circuit with deflection coil 24 being connected across two opposite corners 50 and 51 and with a suitable source of direct current potential, shown here as being battery 52, which may for example have a potential of 300 volts, being connected across the opposite corners, 53 and 54. Tubes 46 and 47 form a first cascade-connected amplifier circuit with the deflecting coil 24 in series therewith and thus when tubes 46 and 47 conduct, it will be seen that deflection coil 24 will be energized in one sense or direction. Likewise, the other two tubes 48 and 49 constitute another cascade-connected amplifier circuit with the deflection coil likewise in series therewith and thus it will be seen that when the tubes 48 and 49 conduct, deflection coil 24 will be energized in the opposite direction or sense. It will be here understood that the deflection coils 23 and 24 have their axes of deflection shifted by 45° with respect to the normal axis of deflection and the axes of deflection of the keystone distortion, as explained heretofore.

It will now be seen that the control grids 55 and 56 of the two tubes 46 and 47 constituting the first cascade-connected amplifier circuit are connected by blocking capacitors 57 and 58 to a first adjustable tap 59 on the grounded center tap resistor section 38*b* while the control grids 60 and 61 of the other tubes 48 and 49 constituting the other cascade-connected amplifier circuit are also connected through blocking capacitors 62 and 63 to another adjustable tap 64 on the other resistor section 38*a*.

It will now be seen that when the sweep voltage component in the output circuit 33 of resolver 28 is positive, as shown at 40 in Fig. 5*a*, the positive voltage 41 developed across resistor section 38*a*, as selected by the adjustable tap 64, is impressed upon the grids 60 and 61 of tubes 48 and 49 thus causing those tubes to conduct thereby to energize deflection coil 24 in a positive direction. At this time, however, the negative voltage 43 developed across resistor section 38*b*, as selected by adjustable tap 59 is impressed upon the control grids 55 and 56 of the other tubes 46 and 47 thus causing these tubes to be cut-off. Conversely, when the sweep voltage component appearing across the output circuit 33 of resolver 28 is negative, as shown at 43 in Fig. 5*b*, the voltage appearing across resistor 38*b* is positive thus causing tubes 46 and 47 to conduct whereas the voltage developed across resistor section 38*a* is negative thus cutting off the other tubes 48 and 49.

It will now be seen that when the sweep voltage component appearing in the output circuit 33 of resolver 28 is positive, as would be the case during scanning in the contracted keystone distortion quadrants E—N and N—W defined by the keystone distortion axes 17 and 18, the deflection coil 24 is energized through the cascade-connected amplifier circuit formed by tubes 48 and 49, and conversely, when the sweep voltage component appearing across output circuit 33 of resolver 28 is negative as would be the case during scanning in the expanded keystone distortion quadrants W—S and S—E defined again by the axes of the keystone distortion 17 and 18, deflection coil 24 is energized through the other cascade-connected amplifier tubes 46 and 47. It will now be seen that the gain of these two pairs of cascade-connected amplifier tubes 46 and 47 and 48 and 49 respectively, is independently controlled by the adjustment of the adjustable taps 59 and 64 on the two resistor sections 38*b* and 38*a* respectively. Thus, adjustable tap 64 on the resistor section 38*a* may be adjusted to provide a higher gain in the cascade-connected amplifier circuit formed by the tubes 48 and 49 and the adjustable tap 59 may likewise be adjusted to provide a lower gain in the cascade-connected amplifier circuit formed by the other two amplifier tubes 46 and 47.

It will be recalled that the deflection circuit 36 connecting the other resolver output circuit 34 to the other deflection coil 23 of tube 22 is identical to the deflection circuit 35 just described, and thus it will be seen that when the sweep voltage components provided by resolver 28 in its output circuits 33 and 34 are polarized so as to cause scanning in the quadrants E—N and N—W defined by the axes 17 and 18 of keystone distortion in which the contracted distortion occurs, the gain is increased, the maximum increase being along the azimuths N′ and E′ as shown at A and B in Fig. 3. Likewise, when the sweep voltage components provided by resolver 28 are polarized to cause scanning in the expanded distortion quadrants W—S and S—E defined by the keystone distortion axes 17 and 18, the gain is decreased, the maximum decrease in gain occurring along the azimuths W′ and S′ as shown at C and D, and it will thus be seen that the keystone distortion is effectively corrected.

It is desirable to provide driven clamps for the control grids of the tubes 46 through 49 in order to provide reference potentials thereon and positively to cut-off the tubes when no sweep voltage component is present. Thus, for the deflection circuit 35, I provide two identical clamping circuits 65 and 66. Clamping circuit 65 includes three serially connected pairs of diodes 67 and 68, 69 and 70, 71 and 72. The anodes of the diodes 67, 69 and 71 are connected together and to one side of a suitable source of potential, such as 300 volts, shown here as being a battery 73 by a suitable resistor 74 and likewise, the cathodes of the tubes 68, 70 and 72 are connected together and to the other side of the battery 73 by a suitable resistor 75; it will now be seen that the 300 volt potential provided by the battery 73 is applied across each of the serially connected pairs of diodes 67 and 68, 69 and 70, 71 and 72. It will further be seen that the battery 73 is floating with reference to ground and thus it is possible to establish a potential at the midpoints between each of the pairs of diodes. This is accomplished by connecting the midpoint 76 between the cathode of the diode 67 and the anode of the diode 68 to the negative side of a suitable source of potential, which may for example be 15 volts, shown here as being a battery 77. With the serially connected pairs of diodes 67—68, 69—70, 71—72 conducting responsive to the connection of battery 73 thereacross and with the current being limited by resistors 74 and 75, it will be seen that the midpoints 78 and 79 between diodes 69 and 70, and 71 and 72 will likewise be at the potential of point 76, i.e., in this case −15 volts. Midpoints 78 and 79 are therefore respectively connected to control grids 56 and 60 of tubes 48 and 47 by connections 80 and 81.

It will now be seen that with an assumed voltage of 300 volts provided by the battery 52 connected across the corners 53 and 54 of the bridge-connected amplifiers 46—49, a potential of on the order of 150 volts will appear across tubes 47 and 48 with the cathodes of these tubes being at ground potential and with the plates being at a potential of 150 volts positive above ground. It is thus seen that the −15 volt potential applied from the midpoints 78 and 79 of the clamping circuit 65 will normally bias tubes 47 and 48 to cut-off.

Clamping circuit 66 is identical to clamping circuit 65, however, providing a suitable higher reference potential for biasing grids 55 and 61 of tubes 46 and 49 to cut-off. Thus, a source of biasing potential, shown here as being battery 82 may provide a reference potential of +135 volts with clamping circuit 66 being connected to grids 55 and 61 of tubes 46 and 49 by connections 83 and 84 as shown. With battery 52 providing 300 volts, it will be understood that the cathodes of tubes 46 and 49 will be at a potential of +150 volts above ground and the plates will be a +300 volts so that the +135 volts provided by the clamping circuit 66 is 15 volts less than the potential of the cathodes and thus the tubes 46 and 49 will also normally be biased to cut-off by the clamping circuit 66.

It will be readily apparent that it is necessary to release the driven clamp provided by the clamping circuits 65 and 66 during the period that a sweep voltage component is applied to the deflection circuit 35 and for this purpose, the anodes of diodes 67, 69 and 71 and the cathodes of diodes 68, 70 and 72 are respectively connected to gate generator 85 by coupling capacitors 86 and 87. Gate generator 85 is coupled to the sweep voltage generator 25 and provides gating pulses 88 thereto which initiate the sweep voltage signals provided by the sweep voltage generator 25. Gate generator 85 is arranged to conventionally supply negative-going gating pulses 89 in synchronism with gating pulses 88 through blocking capacitor 86 to the anodes of diodes 67, 69 and 71 and likewise to provide positive-going gating pulse 90 in synchronism with the gating pulses 88 through blocking capacitor 87 to the cathodes of diodes 68, 70 and 72. It is thus seen that when gate generator 85 provides a gating pulse 88 to the sweep generator 25 thereby to initiate a sweep voltage pulse, negative-going gating pulse 89 drives the anodes of the diodes 67, 69 and 71 in the negative direction wereas the positive-going pulse 90 drives the cathodes of diodes 68, 70 and 72 in the positive direction thereby to cut-off the diodes 67 through 72. When conduction through the diodes 67 through 72 is thus stopped, the −15 volt reference potential from battery 77 is no longer applied to the grids 60 and 56 of the tubes 48 and 47 respectively, thus releasing these grids to follow the potential selected from resistor section 38*b* by adjustable tap 59. The other clamping circuit 66 is likewise connected to the gate generator 85, shown here schematically as by a connection 91 so that negative and positive going pulses corresponding to gating pulses 89 and 90 are applied thereto thereby to release the clamp on the grids 55 and 61 of the tubes 46 and 49 so that these grids may likewise follow the potentials selected from the resistor section 38*a* by the adjustable tap 64. It will be readily understood that two clamping circuits corresponding to clamping circuits 65 and 66 will be provided for the other deflection circuit 36 and are likewise connected to the gate generator 85, and it will thus be seen that all of the amplifier tubes of both deflection circuits 35 and 36 will be normally biased to cut-off by the driven clamps, the clamp being released responsive to the incidence of a gate pulse 88 which initiates a sweep voltage pulse.

In an actual circuit constructed in accordance with Fig. 4, the following components were employed:

| | | |
|---|---|---|
| Resistor sections **38***a* and **38***b* | ohms | 5,000 |
| Capacitors **57**, **58**, **62** and **63** | microfarads | .0022 |
| Tubes **46** and **49** | | 5687 |
| Tubes **47** and **48** | | 5687 |
| Diodes **67**, **68**, **69**, **70**, **71**, and **72** | | 6AL5 |
| Resistors **74** and **75** | megohms | 1 |
| Capacitors **86** and **87** | microfarads | 1 |

It will now be seen that I have provided an improved cathode ray tube system having polar scanning which permits adjustment of the sweep amplitude in each of the four keystone quadrants thereby to correct for keystone distortion.

While I have described above the principles of my invention in connection with specific apparatus, it is to be clearly understood that this description is made only by way of example and not as a limitation to the scope of my invention.

What is claimed is:

1. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; said deflection circuits respectively having means for providing a first gain in said sweep voltage components when said components are polarized to cause scanning in the two quadrants defined by said keystone distortion axes which have contracted distortion and for providing a second gain in said components when the same are polarized to cause scanning in the two quadrants which have expanded distortion, said first gain being higher than said second gain whereby said keystone distortion is corrected.

2. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits having first amplifying means providing a first gain in the respective sweep voltage component when the same is polarized to cause scanning in the two quadrants defined by said keystone distortion axes which have contracted distortion, and second amplifying means providing a second gain in the respective sweep voltage component when the same is polarized to cause scanning in the two quadrants defined by said keystone distortion axes which have expanded distortion, said first gain being higher than said second gain whereby said keystone distortion is corrected.

3. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits comprising means coupled to said resolving means for deriving respectively opposite polarity voltages from the respective sweep voltage component, and first and second amplifying means respectively coupled to said deriving means, said first amplifying means being arranged to conduct with a first gain when the respective sweep voltage component is polarized to cause scanning in the two quadrants defined by said keystone distortion axes which have contracted distortion said second amplifying means being arranged to conduct with a second gain when the respective sweep voltage component is polarized to cause scanning in the two quadrants defined by said keystone distortion axes which have expanded distortion, said first gain being higher than said second gain whereby said keystone distortion is corrected.

4. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits having push-pull amplifying means, said amplifying means having first and second amplifying elements, said first amplifying element being arranged to conduct with a first gain when the respective sweep voltage component is polarized to cause scanning in the two quadrants defined by said keystone distortion axes which have contracted distortion, said second amplifying element being arranged to conduct with a second gain when the respective sweep voltage component is polarized to cause scanning in the two quadrants defined by said keystone distortion axes which have expanded distortion, said first gain being higher than said second gain whereby said keystone distortion is corrected.

5. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits comprising phase splitting means coupled to said resolving means and having two sections for respectively deriving oppositely polarized voltages from the respective sweep voltage component, two amplifying means respectively having their control elements coupled to said phase splitting means sections whereby one of said amplifying means conducts when the respective sweep voltage component has one polarity and the other conducts when the respective sweep voltage component has the opposite polarity, and means for adjusting the gain of said amplifying means arranged so that one of said amplifying means provides a first gain when the respective sweep voltage component is polarized to cause scanning in the two quadrants defined by said keystone distortion axes which have contracted distortion, said adjusting means being arranged so that the other of said amplifying means provides a second gain when the respective sweep voltage component is polarized to cause scanning in the two quadrants defined by said keystone distortion axes which have expanded distortion, said adjusting means being arranged so that said first gain is higher than said second gain whereby said keystone distortion is corrected.

6. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits having first amplifying means providing a first gain in the respective sweep voltage component when the same is polarized to cause scanning in the two quadrants defined by said keystone distortion axes which have contracted distortion, and second amplifying means providing a second gain in the respective sweep voltage component when the same is polarized to cause scanning in the two quadrants defined by said keystone distortion axes which have expanded distortion, said first gain being higher than said second gain whereby said keystone distortion is corrected, and means for respectively clamping said amplifying means to a reference potential thereby to cut-off said amplifying means responsive to absence of said sweep voltage.

7. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits having first amplifying means providing a first gain in the respective sweep voltage component when the same is polarized to cause scanning in the two quadrants defined by said keystone distortion axes which have contracted distortion, and second amplifying means providing a second gain in the respective sweep voltage component when the same is polarized to cause scanning in the two quadrants defined by said keystone distortion axes which have expanded distortion, said first gain being higher than said second gain whereby said keystone distortion is corrected, gate pulse generating means coupled to said sweep voltage generating means for initiating said sweep voltage; and clamping circuit means coupled to said gate pulse generating means and to said amplifying means for respectively clamping said amplifying means to a reference potential thereby to cut-off said amplifying means responsive to absence of a gate pulse, said clamping means being disabled responsive to said gate pulses thereby releasing the clamp on said amplifying means.

8. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits comprising phase splitting means coupled to said resolving means and having two sections for respectively deriving oppositely polarized voltages from the respective sweep voltage component, two amplifying means respectively having their control elements coupled to said phase splitting means sections whereby one of said amplifying means conducts when the respective sweep voltage component has one polarity and the other conducts when the respective sweep voltage component has the opposite polarity, and means for adjusting the gain of said amplifying means arranged so that one of said amplifying means provides a first gain when the respective sweep voltage component is polarized to cause scanning in the two quadrants defined by said keystone distortion axes which have contracted distortion, said adjusting means being arranged so that the other of said amplifying means provides a second gain when the respective sweep voltage component is polarized to cause scanning in the two quadrants defined by said keystone distortion axes which have expanded distortion, said adjusting means being arranged so that said first gain is higher than said second gain whereby said keystone distortion is corrected; and a clamping circuit coupled to said amplifying means control elements for clamping the same to a reference potential thereby cutting off said amplifying means, said clamping circuit being arranged to release the clamp on said amplifying means responsive to occurrence of a sweep voltage.

9. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits comprising phase splitting means coupled to said resolving means and having two sections for respectively deriving oppositely polarized voltages from the respective sweep voltage component, two amplifying means respectively having their control elements coupled to said phase splitting means sections whereby one of said amplifying means conducts when the respective sweep voltage component has one polarity and the other conducts when the respective sweep voltage component has the opposite polarity, and means for adjusting the gain of said amplifying means arranged so that one of said amplifying means provides a first gain when the respective sweep voltage component is polarized to cause scanning in the two quadrants defined by said keystone distortion axes which have contracted distortion, said adjusting means being arranged so that the other of said amplifying means provides a second gain when the respective sweep voltage component is polarized to cause scanning in the two quadrants defined by said keystone distortion axes which have expanded distortion, said adjusting means being arranged so that said first gain is higher than said second gain whereby said keystone distortion is corrected.

10. In combination. a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits comprising phase splitting means coupled to said resolving means and having two sections for respectively deriving oppositely polarized voltages from the respective sweep voltage component, and two pairs of cascade-connected amplifiers having the respective deflection element mutually coupled in series therewith, the control elements of said pairs of amplifiers being respectively coupled to said phase splitting means sections whereby one of said pairs of amplifiers conducts when the respective sweep voltage component has one polarity and the other of said pairs of amplifiers conducts when the respective sweep voltage component has the opposite polarity, said phase splitting means sections respectively including means for adjusting the gain of said pairs of amplifiers and arranged so that one of said pairs of amplifiers provides a first gain when the respective sweep voltage component is polarized to cause scanning in the two quadrants defined by said keystone distortion axes which have contracted distortion, said adjusting means being arranged so that the other of said pair of amplifiers provides a second gain when the respective sweep voltage component is polarized to cause scanning in the two quadrants defined by said keystone distortion axes which have expanded distortion, said adjusting means being arranged so that said first gain is higher than said second gain whereby said keystone distortion is corrected.

11. In combination: a cathode ray tube having a pair of beam deflection elements; and a polar scanning deflection system connected to said deflection elements and arranged to correct keystone distortion in said tube, said system comprising sweep voltage generating means, means for resolving said sweep voltage into sine and cosine components thereby to provide said polar scanning, and two deflection circuits respectively coupling said resolving means to said deflection elements for applying said sweep voltage components thereto; said deflection elements being respectively arranged so that the deflection axes of said tube are displaced by substantially 45° with respect to the axes of said keystone distortion; each of said deflection circuits comprising phase splitting means coupled to said resolving means and having two sections for respectively deriving oppositely polarized voltages from the respective sweep voltage component, and two pairs of cascade-connected amplifiers having the respective deflection element mutually coupled in series therewith, the control elements of said pairs of amplifiers being respectively coupled to said phase splitting means sections whereby one of said pairs of amplifiers conducts when the respective sweep voltage component has one polarity and the other of said pairs of amplifiers conducts when the respective sweep voltage component has the opposite polarity, said phase splitting means sections respectively including means for adjusting the gain of said pair of amplifiers and arranged so that one of said pairs of amplifiers provides a first gain when the respective sweep voltage component is polarized to cause scanning in the two quadrants defined by said keystone distortion axes which have contracted distortion, said adjusting means being arranged so that the other of said pair of amplifiers provides a second gain when the respective sweep voltage component is polarized to cause scanning in the two quadrants defined by said keystone distortion axes which have expanded distortion, said adjusting means being arranged so that said first gain is higher than said second gain whereby said keystone distortion is corrected; a first clamping circuit coupled to the control elements of the two amplifiers of said two pairs of amplifiers having the same potential level with reference to ground, said first clamping circuit being arranged to clamp said two amplifiers to a first reference potential thereby cutting off the same responsive to the absence of a said sweep voltage and to release the clamp thereon responsive to and during the occurrence of said sweep voltage; and a second clamping circuit coupled to the control elements of the other two amplifiers of said two pairs of amplifiers, said second clamping circuit being arranged to clamp said two amplifiers to a second reference potential thereby cutting off the same responsive to the absence of a said sweep voltage and to release the clamp thereon responsive to and during the occurrence of said sweep voltage.

12. In combination: a cathode ray tube having a pair of beam deflection coils; and a polar scanning deflection system connected to said deflection elements and arranged to correct keystone distortion in said tube, said system comprising a saw-tooth sweep voltage generator, a rotatable resolver connected to the output circuit of said sweep voltage generator and arranged to resolve said sweep voltage into sine and cosine components thereby to provide said polar scanning, and two deflection circuits connected respectively between the output circuits of said resolver and said deflection coils for respectively applying said sweep voltage components thereto; said deflection coils being respectively arranged so that the deflection axes of said tube are displaced by substantially 45° with respect to the axes of said keystone distortion; each of said deflection circuits comprising a grounded center tap resistor connected across the respective output circuit of said resolver for respectively deriving oppositely polarized voltages from said respective sweep voltage component, four vacuum tubes connected in a bridge circuit with the respective deflection coil connected across two opposite corners and the other two opposite corners being adapted to be connected to a source of potential, said vacuum tubes being arranged so that a first pair of tubes in opposite legs of said bridge circuit conduct simultaneously to energize said respective deflection coil with one polarity and the second pair of tubes conduct simultaneously to energize said respective deflection coil with the other polarity, the control grids of said first pair of tubes being connected to one side of said center tap resistor by an adjustable tap and the control grids of said second pair of tubes being connected to the other side of said center tap resistor by another adjustable tap whereby said first pair of tubes conduct to energize said respective deflection coil responsive to one polarity of the said respective sweep voltage component and said second pair of tubes conduct to energize said respective deflection coil responsive to the other polarity of said respective sweep voltage component, said adjustable taps being respectively adjusted so that one of said pairs of tubes has a first gain when the respective sweep voltage component is polarized to cause scanning in the two quadrants defined by said keystone distortion axes which have contracted distortion and the other of said pair of tubes has a second gain lower than said first when said respective sweep voltage component is polarized to cause scanning in the two quadrants defined by said keystone distortion axes which have expanded distortion whereby said keystone distortion is corrected.

13. The combination of claim 12 further comprising: a gate pulse generator connected to said sweep voltage generator for initiating said sweep voltage and determining the duration thereof; a first clamping circuit comprising three pairs of serially connected diodes, said three pairs of diodes being adapted to be connected across a source of potential, one of said pairs of diodes having its midpoint adapted to be connected to a first source of reference potential, the midpoints of the other two of said pairs of diodes being respectively connected to the control grids of the two of said amplifier tubes which are at the same potential with respect to ground for normally clamping the grids of said two tubes to said first reference potential thereby to cut-off said tubes, said gate generator being connected to the opposite sides of said pairs of diodes for respectively supplying negative and positive gate voltages thereto thereby to cut-off said diodes to release the clamp on said tubes during the occurrence of a sweep voltage; and another clamping circuit identical with said first clamping circuit and connected between said gate generator and the grids of the other two amplifier tubes for normally clamping the same at a second reference potential thereby to cut-off said tubes and for releasing the clamp thereon during the occurrence of said sweep voltage.

References Cited in the file of this patent

UNITED STATES PATENTS

| | | |
|---|---|---|
| 2,304,057 | Schade | Dec. 1, 1942 |
| 2,578,268 | Shermin | Dec. 11, 1951 |